Aug. 14, 1951  D. D. AUSTIN, SR  2,563,907
ROTARY CUTTER
Filed Nov. 18, 1946  3 Sheets-Sheet 1
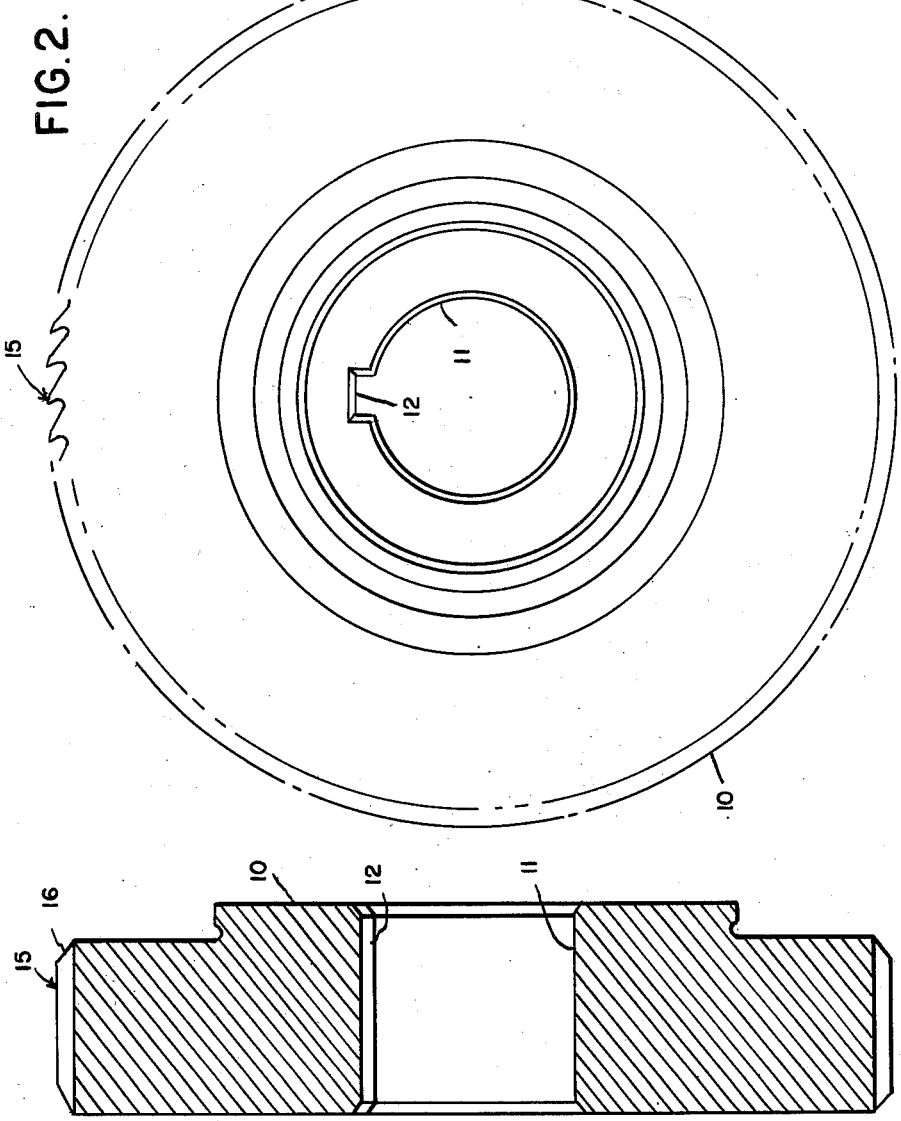
INVENTOR.
DONALD D. AUSTIN SR.
BY
Whittemore, Hulbert
and Belknap
ATTORNEYS Aug. 14, 1951     D. D. AUSTIN, SR     2,563,907
ROTARY CUTTER
Filed Nov. 18, 1946     3 Sheets-Sheet 2
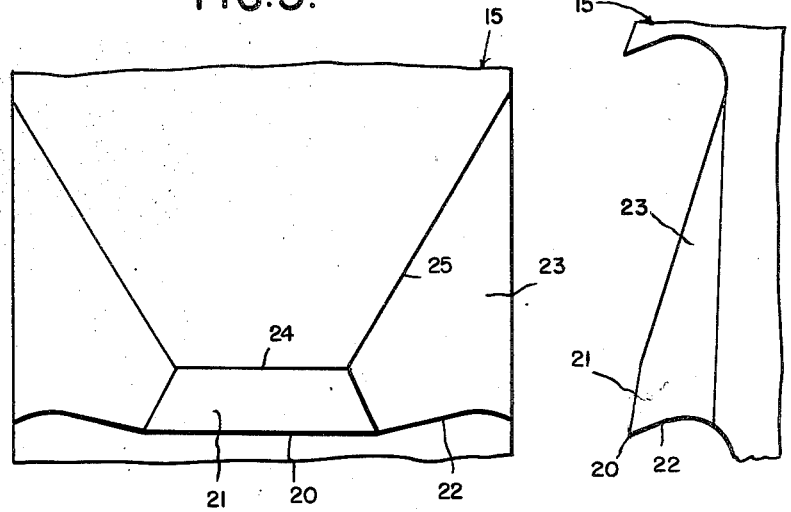
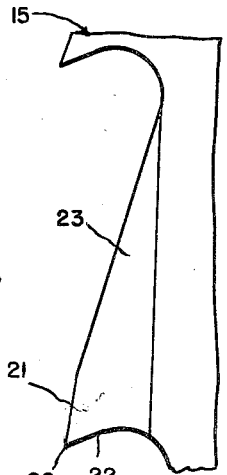
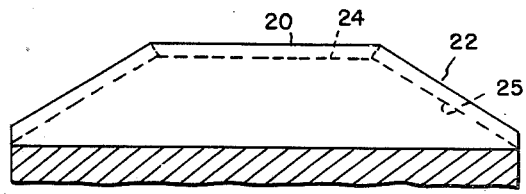
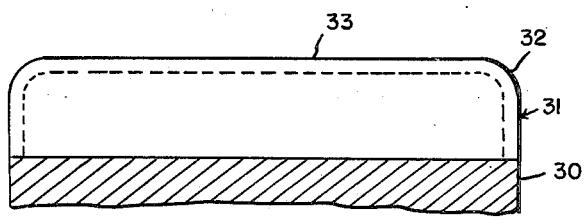
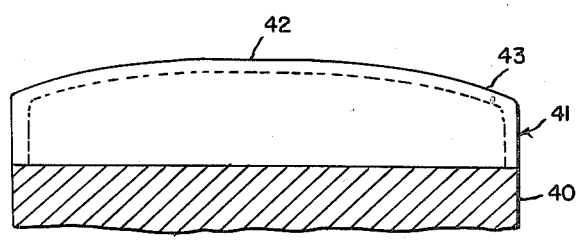
INVENTOR.
DONALD D. AUSTIN SR
BY
Whittemore, Hulbert
and Belknap    ATTORNEYS Aug. 14, 1951  D. D. AUSTIN, SR  2,563,907
ROTARY CUTTER Filed Nov. 18, 1946  3 Sheets-Sheet 3

INVENTOR.
DONALD D. AUSTIN SR.
BY Whittemore,
Hulbert & Belknap
ATTORNEYS

Patented Aug. 14, 1951

2,563,907

UNITED STATES PATENT OFFICE 2,563,907

ROTARY CUTTER

Donald D. Austin, Sr., Detroit, Mich., assignor to National Broach & Machine Company, Detroit, Mich., a corporation of Michigan Application November 18, 1946, Serial No. 710,642

5 Claims. (Cl. 29—103)

The present invention relates to a rotary metal cutting tool and more particularly to a tool designed for the finishing of the cylindrical surface of electric or magnetic rotors.

In my prior copending application entitled "Method for Finishing Electric Rotors," Serial No. 703,161 filed October 14, 1946, and now Patent No. 2,497,023, granted February 7, 1950, there was disclosed the finishing of the external cylindrical surface of an electric or magnetic rotor by the use of a rotary cutting tool of circular cross section, in which the cutting tool and work piece were brought into contact with their axes crossed and thereafter a relative translation was effected in a direction such as to cause the center of crossed axes (or the zone of contact between the cutter and work piece) to move from one end to the other of the work piece. The tool which forms the subject matter of the present invention is designed and particularly adapted for use in the practice of the invention disclosed in the copending application.

The work piece for which the tool is designed is normally built up of a multiplicity of laminations of a hard metal such for example as silicon steel which are pressed into very tight relationship. In many forms of rotors of this type slots are formed in the periphery of the laminated plates, these slots being brought into registry in the assembly. Conductors are then provided so as to extend through the slots thus formed, and in many cases the slots are filled with soft metal such for example as white metal. In the assembled rotor as it is presented for machining the soft metal which has been provided in the slots of the rotor extends in many instances substantially above the generally cylindrical surface defined by the outer periphery of the laminations.

In order to effect a preliminary cleaning up of the surface of the rotor prior to the finishing contact between the tool and rotor at and adjacent the center of crossed axes, and to avoid deleterious end-cutting by the cutter, the cutter is provided with an end section of generally conical or tapered shape. Due to the conical or tapered shape of the end section and also to the crossed axes relationship between the rotor and cutter, portions of the soft metal which project outwardly beyond the generally cylindrical surface of the laminations are progressively removed before the finishing operation is performed on the surface of the laminations.

With the foregoing general remarks in view, it is an object of the present invention to provide a rotary cutter which is adapted to finish a work piece of circular cross section to finished dimension and at the same time to perform a cleaning up operation preliminary to the finishing operation all in a single cutting stroke.

It is a further object of the present invention to provide a rotary cutter having a tapered or conical end section adapted to progress across a rotary work piece in advance of a cylindrical finishing section.

It is a further object of the present invention to provide a rotary cutter having a tapered end portion provided with cutting teeth which are shaped to afford the necessary cutting clearance.

Other objects and features of the invention will become apparent as the description proceeds, especially when taken in conjunction with the accompanying drawings, wherein:

Figure 1 is a diametrical section through a cutter;

Figure 2 is a plan view of the cutter with parts broken away;

Figure 3 is a top plan view of a single tooth of the cutter on a greatly enlarged scale;

Figure 4 is a front elevation of the tooth shown in Figure 3;

Figure 5 is a side elevation of the tooth shown in Figure 3;

Figure 6 is a front elevation of a somewhat modified tooth form; and

Figure 7 is a front elevation of another somewhat modified tooth form.

Figure 8:
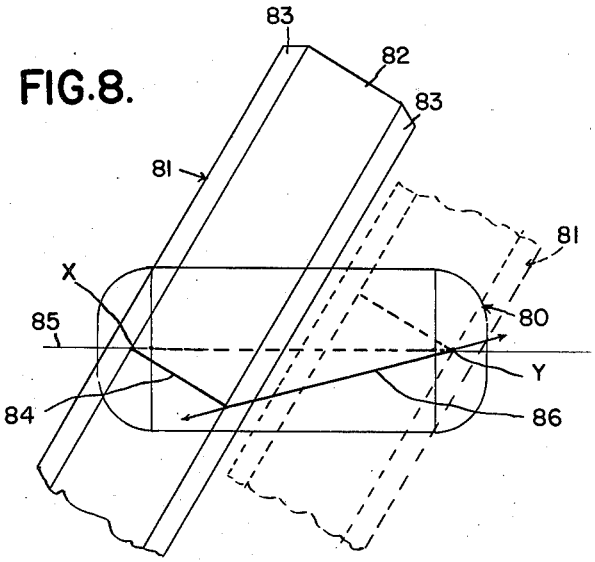
Figure 8 is a diagrammatic view illustrating the action of the cutter on the work piece.

Referring now to Figures 1 and 2, the cutter comprises a metal disk 10 having a central opening 11 provided with a keyway 12 for connection to a driving shaft. Around the periphery of the cutter are a plurality of cutting teeth 15 which, as seen in Figure 2, are spur teeth but which may be provided at a helix angle if preferred. As best seen in Figure 1, the teeth 15 are beveled off as indicated at 16 to form conical end portions on the cutter.

Referring now to Figures 3, 4 and 5, which show a single tooth of the cutter on a greatly enlarged scale, the tooth 15 has a top cutting edge 20, the cutting edges 20 of all of the teeth defining a cylindrical envelope. In back of the cutting edge 20 the tooth is provided with a top surface 21 disposed at an angle to a tangent to the cutter so as to provide top rake or clearance. This angle may be on the order of 5° to 8°. The conical end portions of the cutter have cutting edges 22, and in order to provide these cutting edges with the proper clearance the surface 23 in back of the cutting edges 22 extends at an angle, as measured in the plane of rotation, which provides top rake or clearance on the same order as the clearance provided by the surface 21. It will be appreciated that in order to provide the surfaces 23 as just described, each must be ground independently at an angle which is compounded from the cone angle of the conical end portion and the predetermined top rake or clearance angle to be provided.

As best seen in Figure 4, the construction just described provides cutting edges 20 and 22, each of which has sufficient top rake or clearance as indicated by the spacing between the cutting edges 20 and 22 and surface boundaries 24 and 25 which lie behind the cutting edges 20 and 22, respectively.

A somewhat modified form of cutter is illustrated in Figure 6. In this figure the cutter 30 is provided with teeth 31 which define a cylindrical central portion 33. The teeth are tapered off at the ends to provide rounding portions 32 which serve as roughing portions to remove the excess material from the rotor, the construction being such that end-cutting is avoided.

Referring now to Figure 7, another embodiment of the invention is illustrated. In this figure the cutter 40 is provided with a plurality of teeth 41, each of which has a central cylindrical portion 42 and curved end portions 43. The modification in Figure 7 differs from the modification in Figure 6 in that the curved end portions are of greater extent, being more gradually curved, and the central cylindrical portion 42 is of considerably less extent than the central cylindrical portion 33 of the teeth of the cutter 30.

In all three illustrated embodiments of this invention the arrangement is such that end-cutting or end contact between the teeth of the cutter and the irregularly projecting metal on the rotor is avoided. It will be appreciated that due to the crossed axes relationship discussed in the prior copending application Serial No. 703,161, theoretical contact between the finished surface of the rotor and the teeth of the cutter is limited to a very narrow annular zone, and further that radial clearance appears between portions of the cutter away from the instantaneous center of crossed axes and the surface of the rotor. However, this clearance is relatively small and is insufficient to prevent end contact between teeth of an unmodified cylindrical cutter and the projecting portions of the metal.

Due to the use of the cutter in crossed axes relationship with the work piece and with a relative feed which is diagonal to the axes of both the work piece and the cutter, the point of instantaneous closest contact between the cutter and work piece (which is usually termed the "center of crossed axes") is caused to travel relative both to the work piece and cutter. Accordingly, in the use of the cutter it is essential that for best results the direction of relative traverse is such that the center of crossed axes remains always between the ends of the cylindrical central portion of the cutter. In the modification illustrated in Figure 7 where this central portion 42 is relatively narrow, the possible direction of relative traverse between the work piece and the cutter is accordingly relatively restricted.

Figure 9:
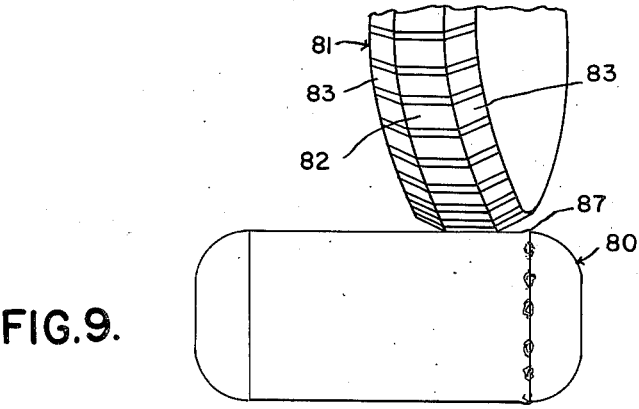
Figure 9 is a fragmentary front elevation showing a portion of the cutter in contact with the periphery of the work piece.

As illustrated in Figures 8 and 9 the cutter has a tapered or conical portion designed to effect a roughing operation prior to the finishing operation carried out by its central cylindrical portion. Referring first to Figure 8, a work piece in the form of laminated electric rotor is illustrated at 80. The outline of a cutter is illustrated in initial position at 81. It will be appreciated that the cutter 81 has a plurality of identical teeth on its periphery but these teeth have been omitted for clarity in Figure 8. The central portion 82 of the cutter is a cylindrical finishing portion. The opposite sides of the cutter are conical or inclined roughing portions 83. The cutter 81 and the work piece 80 are both rotated about the axis and the cutter is positioned as indicated in Figure 8. In this position the axis 84 of the cutter is disposed at an angle to the axis 85 of the electric rotor. With the parts shown in the position of Figure 8 the apparent intersection between the axis 84 of the cutter and the axis 85 of the work piece is at the point X, which point lies within the cylindrical portion 82 of the cutter.

With the parts in the position shown a relative traverse between the cutter 81 and the work piece 80 is effected in the direction of the arrow 86 and the operation is continued until the cutter 81 reaches the dotted line position indicated at 81'. In this position the apparent intersection between the axis 84 of the cutter and the axis 85 of the work piece is at the point Y. It will be understood that during traverse the apparent intersection between these axes has migrated from the point X to the point Y and thus the entire surface of the work piece will have been finished by the central cylindrical finishing portion of the cutter.

The conical roughing portion 83 of the cutter moves across the rotor 80 in advance of the finishing section and performs a roughing operation. This function is particularly well illustrated in Figure 9 at which certain rough projections are indicated at 87. These projections may be formed by welding or brazing at the ends of the rotor. If the inclined roughing portions 83 of the cutter were omitted the ends of the teeth of the central cylindrical portion 82 would be brought into endwise contact with these projections. By providing the inclined roughing portions 83, the rough projections such as 87, are machined away so that the central finishing portion 82 is required only to remove a definite minimum amount of stock to finish the surface of the work piece.

It has been found that the cutter just described is well adapted to perform the finishing operation referred to in a single stroke, so that in the operation of a machine employing the present cutter a rotor may be set up between centers and the cutter may be traversed across the work piece in one direction, simultaneously removing the irregular projections of the soft metal and finishing the surface of the steel laminations to desired dimension. The work piece may then be removed, the second work piece substituted, and the cutter traversed in the reverse direction to initial position to finish the second work piece. This method completely avoids the necessity of taking independent rough cut to remove surface irregularities before the final finishing operation, and as will be apparent, materially increases the output of a single machine. At the same time, the cutting edge 20 which performs the finished cutting operation is not subjected to the preliminary rough cut, and the relatively large chips of soft metal removed by the conical end portion are disposed of before the finishing operation takes place at any point on the surface of the work piece.

While I have illustrated and described three separate embodiments of my improved rotary metal cutting tool, it will be appreciated that this has been done merely to enable those skilled in the art to practice the invention, the scope of which is indicated by the appended claims.

What I claim as my invention is:

1. A rotary cutter of circular cross-section having peripheral cutting teeth each of which is continuous from end to end of said cutter, said cutter having a central finishing section in which the cutting edges of said teeth occupy an imaginary cylinder, all of said teeth at one end thereof being of gradually reduced height progressively from said finishing section to the end of the cutter forming a roughing section in which the cutting edges of said teeth occupy an imaginary cone.

2. A cutter as defined in claim 1 in which the teeth at the roughing end of said cutter have cutting edges at their ends in addition to the cutting edges on the tops of the teeth.

3. A cutter as defined in claim 1 in which similar roughing sections as defined are provided at both ends of said cutter.

4. A cutter as defined in claim 1 in which all of the cutting edges are relieved to provide cutting clearance in back of the cutting edges in the plane of rotation.

5. A cutter as defined in claim 1 in which said teeth extend generally parallel to the axis of the cutter.

DONALD D. AUSTIN, Sr.

REFERENCES CITED

The following references are of record in the file of this patent:

UNITED STATES PATENTS

| Number | Name | Date |
|---|---|---|
| 511,607 | Gay | Dec. 26, 1893 |
| 1,429,614 | Muller | Sept. 19, 1922 |
| 1,663,241 | Cheshire | Mar. 26, 1928 |
| 2,206,770 | Drummond | July 2, 1940 |
| 2,278,738 | Praeg | Apr. 7, 1942 |
| 2,297,611 | Drummond | Sept. 29, 1142 |
| 2,315,982 | Phaeuf | Apr. 6, 1943 |

FOREIGN PATENTS

| Number | Country | Date |
|---|---|---|
| 703,369 | Germany | Mar. 7, 1941 |